United States Patent [19]

Tang et al.

[11] Patent Number: 4,717,749

[45] Date of Patent: Jan. 5, 1988

[54] PRESSURE SENSITIVE ADHESIVES CONTAINING BLOCK COPOLYMER

[75] Inventors: Raymond W. Tang, Houston, Tex.; Lu H. Tung, Midland, Mich.

[73] Assignee: The Dow Chemical Company, Midland, Mich.

[21] Appl. No.: 768,378

[22] Filed: Aug. 22, 1985

Related U.S. Application Data

[63] Continuation-in-part of Ser. No. 693,391, Jan. 22, 1985, abandoned, which is a continuation-in-part of Ser. No. 608,626, May 9, 1984, abandoned.

[51] Int. Cl.$^4$ ................................. C08L 53/02
[52] U.S. Cl. ..................... 524/271; 524/270; 524/274; 524/505; 525/89; 525/98
[58] Field of Search ............... 524/270, 274, 505, 271; 525/98, 89

[56] References Cited

U.S. PATENT DOCUMENTS

| | | |
|---|---|---|
| 3,932,328 | 1/1976 | Korpmman ..................... 524/505 |
| 4,131,709 | 12/1978 | Schunck et al. .................. 525/98 |
| 4,427,837 | 1/1984 | Tung et al. ...................... 525/314 |
| 4,444,953 | 4/1984 | St. Clair ........................... 525/98 |

FOREIGN PATENT DOCUMENTS 2348923 4/1974 Fed. Rep. of Germany ...... 525/314

*Primary Examiner*—Wilbert J. Briggs, Sr.

[57] ABSTRACT

A pressure sensitive adhesive composition is provided. The adhesive comprises an ABA block polymer wherein A represents a copolymer of styrene and alpha-methylstyrene and B represents blocks of diene polymer. The diene polymer can be butadiene, isoprene or a mixture thereof. The composition also contains a tackifying resin.

7 Claims, No Drawings

PRESSURE SENSITIVE ADHESIVES CONTAINING BLOCK COPOLYMER

This application is a continuation-in-part of copending application Ser. No. 693,391 filed Jan. 22, 1985, which is a continuation-in-part of Ser. No. 608,626 filed May 9, 1984, both now abandoned.

A wide variety of pressure sensitive adhesive compositions have been available for many years. One particularly useful variety of such pressure sensitive adhesive compositions are those compositions which contain block copolymer. Such block copolymers generally are of the ABA configuration wherein the A blocks are of a polymer of relatively rigid material and the B blocks are of a polymer of a diene such as butadiene or isoprene. Such block copolymers are well known and are set forth in the following U.S. patents: U.S. Pat. Nos. 3,239,478; 3,592,710; 3,635,861; 3,676,202; 3,723,170; 3,935,338; 4,131,709; 4,136,137; 4,178,275; 4,325,770 and German Offenlegunsschrifts Nos. 2348923 and 2736952, the teachings of which are herewith incorporated by reference thereto.

Pressure sensitive adhesive compositions employing triblock polymers often are found lacking in their abiity to withstand heat and such adhesives have a marked tendency to creep.

It would be desirable if there were available an improved pressure sensitive adhesive formulation having a greater resistance to heat and having a greater resistance to creep while providing desired adhesion.

These benefits and other advantages in accordance with the present invention are achieved in a pressure sensitive adhesive composition comprising (1) a block copolymer of ABA configuration wherein A is a copolymer of alpha-methylstyrene and styrene and the B portion of the polymer is a polydiene; (2) a diblock copolymer of AB type of an amount from 0 to 50 parts per weight per hundred parts of the ABA triblock copolymer; (3) a tackifying resin compatible with block B in the amount of 10 to 200 parts per hundred parts of the block copolymer; (4) a reinforcing resin having a higher softening point than the block A in the ABA polymer in the amount of from about 0 to 100 parts per hundred parts of the block ABA block copolymer; (5) an extending oil in an amount from 0 to 50 parts by weight per hundred parts by weight of the ABA block copolymer; and (6) a stabilizer in the amount of 0 to 5 parts per hundred parts by weight of the block ABA block copolymer.

Triblock copolymers useful in the practice of the present invention are described in U.S. Pat. No. 4,427,837 and in pending U.S. patent application Ser. No. 525,336 filed Aug. 22, 1983 now abandoned having a continuation-in-part U.S. patent application Ser. No. 630,906 filed July 13, 1984, now abandoned, the teachings of which are herewith incorporated by reference thereto.

ABA block copolymers suitable for use with the practice of the present invention require that the A block have an alpha-methylstyrene to styrene weight ratio of from 2 to 98 to 98 to 2; and the preferred range is 1. 1 to 2.5 to 1. The B block of the block copolymers is a member selected from the group consisting of polyisoprene, polybutadiene or isoprene-butadiene copolymer. The ratio of the A block to the B block is from about 10 to 90 to 45 to 55 with a preferred range of 15 to 85 and 30 to 70.

The triblock copolymers of the following examples and the method of their preparation are described in U.S. Pat. No. 4,427,837 and copending patent application Ser. No. 525,336 filed Aug. 22, 1983. In the preparation of the triblock copolymers, conventional anionic polymerization techniques were employed. Air and moisture were excluded from the reaction vessels; monomers purified by passing through alimina columns or distilled under nitrogen or vaccuum in the presence of a drying agent. The difunctional organolithium initiator employed is described in U.S. Pat. No. 4,196,154 and U.S. Pat. No. 4,172,190 herewith incorporated by reference thereto.

The initiator was prepared in toluene solution by reacting secondary butyllithium with 1,3-bis(1-phenylethenyl) benzene in a mole ratio of 2 to 1 at room temperature for a period of about 45 to 60 minutes. The concentration of the initiator solutions used in the examples range from about 0.05 normal to 0.02 normal.

Many low molecular weight resins may be employed as tackifiers such as rosin ester types as are commercially available under the trade designation of Floral 85; polyterpene such as is commercially available under the name Wingtac 95; polyolefin resins, such as Super Sta-Tac 80; polydipentenes such as Zonarez 7085; polypinenes such as Zonarez 5. Stabilizers are generally of the hindered phenol type and are well known and common in the art.

The pressure sensitive adhesive compositions of the present invention can contain from 0 to 5 parts per hundred parts by weight of the ABA block copolymer such materials as antioxidants and stabilizers. These include stabilizers for protection of both the diene center blocks and the non-elastomeric terminal blocks. Combinations of stabilizers are often more effective, due to the different mechanisms of degradation to which each of these types of blocks is subject. Certain hindered phenols, organo-metallic compounds, aromatic amines and sulfur compounds are useful for this purpose. Especially effective types of these materials includes the following:

(1) Benzothiazoles, such as 2-(dialkyl-hydroxy-benzyl-thio)benzothiazoles,
(2) Esters of hydroxybenzyl alcohols, such as benzoates, phthalates, stearates, adipates or acrylates of 3,5-dialkyl-4-hydroxybenzyl alcohols,
(3) Stannous phenyl catecholates,
(4) Zinc dialkyl dithiocarbamates,
(5) Alkyl phenols, e. g., 2,6-di-tert-butyl-4-methyl phenol.

The tackifying resins employed together with the subject block copolymers and tackifying resin are represented by the following:
Rosin
Dehydrogenated rosin
Rosin+polyterpene resins, e.g., polymerized betapinene (from 100% rosin to 100% resin)
Glycerol esters of hydrogenated rosin
Pentaerythritol esters of hydrogenated rosin
Coumarone-indene resins
Hydrogenated rosin
Glycerol esters of polymerized rosin
Maleic anhydride-modified rosin and rosin derivatives
Partial esters of styrene-maleic acid copolymers
Chlorinated biphenyls (S.P. 113°–320° F.)
Oil-soluble phenol-aldehyde resin The extender oils employed together with the tackifying resins and block copolymers have the chief advantage of substantially reducing the cost of the composition while improving tack and flexibility without any material degradation in other properties thereof. The oils must be chosen with care to coordinate with the block copolymer relative to the compatability with the several polymer blocks present therein. As stated hereinbefore, the oil should be one which is substantially compatible with homopolymers of conjugated dienes but which is substantially incompatible with homopolymers of the nonelastic (thermoplastic) terminal blocks. Compatibility can be determined by the following type of test:

An oil to be tested is mixed in several proportions (e.g., 5, 25 50, phr.) with the type of block copolymer of interest in a volatile mutual solvent, for example, toluene. A thin film is cast by spreading the solution evenly on a glass surface and allowing the solvent, toluene, to evaporate over a period of 16-24 hours at ambient temperature. Suitability of the oil for use as an extender is judged by the tensile strengths of the oil-containing polymer films determined in pounds per square inch by an appropriate testing instrument and by the appearance of the film surface. Excessive compatibility with the terminal polymer segments will cause severe loss of tensile strength, greater than that resulting from simple dilution of the polymer. Excessive incompatiblity will be evidenced by diffusion of the oil to the film surface.

Reinforcing resins suitable for the practice of the present invention are thermoplastic resins having a glass transition temperature at least about 10° centigrade above the glass transition temperature of the A block of the ABA block copolymer. Typical of resins useful for reinforcement are polyalphamethyl styrene, poly 2,6-dimethyl phenylene oxide resin and a coumarone-indene resin and is comercially available under the trade designation Cumar LX-509.

The compositions of the present invention can be designed for a wide variety of uses and applications. They may be applied to paper, paper boards, wood, metal foils, polyolefin films, polyvinyl chloride films, cellophane, felts, woven fabrics, non-woven fabrics, glass, etc., and for bonding two or more of such materials together. The adhesives are useful in pressure sensitive tapes, such as masking tapes, adhesive sheets, primers for other adhesives, adhesive tapes, mending tapes, electrical insulation tape, laminates, hot-melt adhesives, mastics, cements, caulking compounds, binders, sealants, pressure sensitive adhesives otherwise, delayed tack adhesives, adhesive latices, shoe sole adhesives, cloth backings, carpet backings, cements, etc.

Pressure sensitive adhesives of the present invention can be applied to substrates as a hot melt, for example, by extrusion from a sheeting die or slot die. Alternatively the compositions can be deposited from a solution such as 15 weight percent solution in 9:1 by volume toluene-methanol solvent. The invention is further illustrated but not limited by the following examples.

EXAMPLE 1

A 2-liter reactor was charged with 1,225.8 grams of alpha-methylstyrene. A sec-butyllithium solution was slowly added to the alpha-methylstyrene until a faint straw color appeared titrating the impurities in the alphamethylstyrene. When the titration was complete, 177.4 grams of isoprene and 12 grams of styrene was added to the reactor. The reaction mixture was heated to 45 degrees centigrade whereupon 1.53 millimoles of the hereinbefore difunctional initiator were added. The reaction mixture was heated to 50 degrees centigrade whereupon the heat of polymerization raised the temperature of the reactants to about 75 degrees centigrade in about 30 minutes. As the temperature of the reaction mixture started to return to 50 degrees, the color of the reaction mixture changed from a pale straw color to a brownish organe indicating that the polymerization of isoprene was complete and that the copolymerization of styrene and alpha-methylstyrene had begun. The temperature of the reaction mixture was maintained above 50 degrees centigrade for an additional 45 minute period and a mixture of ispropenol and toluene, 10 to 1 by volume, was added slowly to the reaction mixture until the color began to fade. The reaction mixture was then heated to a temperature of 70 degrees for an addition period of 15 minutes and cooled to room temperature. About 130 grams of the reaction mixture was removed for analysis. To the remainder of the reaction mixture 154.7 grams of isoprene, 10.5 grams of styrene were added. The mixture was then heated to 45 degrees centigrade and 1.33 millimoles of the difunctional initiator solution was added. The second polymerization was permitted to proceed similarly for about 2 hours. The reaction mixture was terminated by the addition of 2 milliliters of isopropanol. A hindered phenol stabilizer in an amount of 3.7 grams was added and the excess alpha-methylstyrene monomer was removed by heating in a vacuum oven. The total yield was 333 grams. The polymer was an ABA triblock with polyisoprene as the center block and alpha-methylstyrene styrene copolymer as the end blocks. The composition as determined by proton nuclear magnetic resonance was 81 weight percent isoprene, 12.7 weight percent alpha-methylstyrene and 6.3 weight percent styrene. The molecular weight of the polymer as detemined by gel permeation chromatography was 176,000 molecular weight units.

The block copolymer was then mixed with an aliphatic hydrocarbon tackifying resin commercially designated as ESCOREZ 1310 commercially available from the Exxon Chemical Company. Varying proportions were employed as set forth in Table I below. Included in the mixture was one part by weight per hundred parts by weight of resin of a solid hindered phenol stabilizer commercially available under the trade designation IRGANOX 1010 and available from Ciba-Geigy Corporation. Fomulations were dissolved in toluene and applied to polyester film as toluene solutions; roughly equal parts of toluene and the adhesive formulation were used. Various physical properties were then determined. The peel strength shown in Table I is based on the Pressure Sensitive Tape Council test method PSTC-1. The rolling ball tack test was based on PSTC-6. The quick stick test employed was PSTC-5 and the shear holding test based on test method PSTC-7 and was conducted at 177 degrees Fahrenheit with a 450 gram weight attached to the specimen; holding time in minutes is set forth in the Table.

TABLE I

| ADHESIVE PERFORMANCE OF COMPOSITIONS CONTAINING TRIBLOCK PREPARED IN EXAMPLE 1. | | | | | | | | |
|---|---|---|---|---|---|---|---|---|
| ABA polymer Wt. % | 73.5 | 69.9 | 66.7 | 62.5 | 61.0 | 58.8 | 55.0 | 50.0 |
| Escorez 1310 Wt. % | 26.5 | 30.1 | 33.3 | 37.5 | 39.0 | 41.2 | 45.0 | 50.0 |
| Rolling ball tack (cm) | 4.0 | 5.0 | 4.5 | 4.5 | 5.0 | 4.5 | 12.0 | >26 |
| 180 Peel strength | 2.49 | 2.3 | 2.74 | 2.6 | 2.6 | 3.02 | 3.7 | 4.23 |

TABLE I-continued
ADHESIVE PERFORMANCE OF COMPOSITIONS CONTAINING TRIBLOCK PREPARED IN EXAMPLE 1.

| (lb/in) | | | | | | | | |
|---|---|---|---|---|---|---|---|---|
| Quick stick (lb/in) | 1.86 | 1.34 | 1.94 | 1.73 | 1.27 | 1.46 | 2.2 | 2.74 |
| Holding time (min) | all >4100 | | | | | | | |

Wt. % = Weight percent
cm = centimeter
lb/in = pounds per inch
min = minute

For purposes of comparison similar formulations were prepared utilizing a commercially available styrene isoprene triblock copolymer available under the trade designtion Kraton 1107. The commercially available block copolymer contained 86 percent by weight isoprene and 14 weight percent styrene polymerized therein. Molecular weight as determined by gel permeation chromatography was 169,000 molecular weight units. The results are set forth in Table II.

TABLE II
ADHESIVE PERFORMANCE OF COMPOSITIONS CONTAINING A COMMERCIAL STYRENE-ISOPRENE TRIBLOCK POLYMER

| ABA polymer Wt. % | 75 | 70 | 65 | 62 | 60 | 55 | 50 | 45 |
|---|---|---|---|---|---|---|---|---|
| Escorez 1310 Wt. % | 25 | 30 | 35 | 38 | 40 | 45 | 50 | 55 |
| Rolling ball tack (cm) | 3.0 | 2.0 | 3.5 | 4.0 | 5.0 | 4.5 | 14.0 | 26.0 |
| 180 Peel strength (lb/in) | 2.43 | 2.7 | 2.8 | 3.1 | 3.0 | 4.0 | 4.8 | 5.1 |
| Quick stick (lb/in) | 1.15 | 1.36 | 1.47 | 1.82 | 1.78 | 2.02 | 2.13 | 2.26 |
| Holding time (min) | 2978 | 2436 | 1633 | 1085 | 984 | 961 | 730 | 310 |

Wt. % = Weight percent
cm = centimeter
lb/in - pounds per inch
min = minute

The 55/45 compositions of both Tables I and II were used to prepare each a 50 weight percent solution in toluene. A brookfield viscometer rotating at 5 rpm at room temperature indicated the solution viscosity of the composition in accordance with the present invention to be 4,300 centipoise. Whereas the composition containing the commercial triblock polymer had a viscosity of 6,600 centipose. The lower solution viscosity provides a material that is easier to apply. However, the holding time at higher temperature is considerably greater with compositions in accordance with the invention as exemplified by Table I.

A further series of pressure sensitive adhesive compositions were prepared and evaluated in the hereinbefore discussed manner. The test results are set forth in Table III.

TABLE III
ADHESIVE PERFORMANCE OF COMPOSITIONS CONTAINING TRIBLOCK PREPARED IN EXAMPLE

| ABA polymer Wt. % | 73.5 | 69.9 | 66.7 | 62.5 | 61.0 | 58.5 | 55.0 |
|---|---|---|---|---|---|---|---|
| Piccolyte A115 Wt. % | 26.5 | 30.1 | 33.3 | 37.5 | 39.0 | 41.2 | 45.0 |
| Rolling ball tack (cm) | 3.0 | 4.0 | 4.0 | 5.0 | 7.0 | 8.0 | 17.0 |
| 180 Peel strength (lb/in) | 3.0 | 3.25 | 3.17 | 4.47 | 4.5 | 4.62 | 6.0 |
| Quick stick | 2.4 | 2.5 | 2.36 | 2.9 | 3.0 | 2.9 | 3.1 |

TABLE III-continued
ADHESIVE PERFORMANCE OF COMPOSITIONS CONTAINING TRIBLOCK PREPARED IN EXAMPLE

| (lb/in) | |
|---|---|
| Holding time (min) | all >4100 |

Wt. % = Weight percent
Cm = centimeter
lb/in - pounds per inch
min = minute

EXAMPLE 2

Another triblock copolymer composition was prepared by the method described in Example 1 with the exception that a slightly larger amount of initiator was used in each of the two polymerization steps. The resultant block copolymer had an identical composition as to the block copolymer prepared in Example 1; however, the molecular weight as measured by gel permeation chromatography was 155,000 molecular weight units.

Two series of experiments were conducted; one using Escorez 1310 as the tackifier and the other using Piccolyte A115 as the tackifier. The results are set forth in Tables IV and V.

TABLE IV
ADHESIVE PERFORMANCE OF COMPOSITIONS CONTAINING TRIBLOCK PREPARED IN EXAMPLE 2

| ABA polymer Wt. % | 65 | 60 | 55 | 50 | 45 | 40 |
|---|---|---|---|---|---|---|
| Escorez 1310 Wt. % | 35 | 40 | 45 | 50 | 55 | 60 |
| Rolling ball tack (cm) | 3.0 | 2.0 | 3.0 | 6.0 | 8.0 | no tack |
| 180 Peel Strength (lb/in) | 3.33 | 3.87 | 4.63 | 5.24 | 6.12 | — |
| Quick stick (lb/in) | 1.83 | 2.04 | 2.10 | 2.20 | 2.43 | — |
| Holding time (min) | all >4100 | | | | | |

Wt. % = weight percent
cm = centimeter
lb/in = pound per inch
min = minute

TABLE V
ADHESIVE PERFORMANCE OF COMPOSITIONS CONTAINING TRIBLOCK

| ABA polymer Wt. % | 65 | 60 | 55 | 50 | 45 | 40 |
|---|---|---|---|---|---|---|
| Piccolyte A115 Wt. % | 35 | 40 | 45 | 50 | 55 | 60 |
| Rolling ball tack (cm) | 12.0 | 12.0 | 13.0 | >26 | no tack | no tack |
| 180 Peel strength (lb/in) | 4.1 | 4.09 | 4.48 | 5.31 | — | — |
| Quick stick (lb/in) | 2.01 | 2.02 | 2.18 | 2.25 | — | — |
| Holding time (min) | all >4100 | | | | | |

Wt. % = Weight percent
cm = centimeter
lb/in = pounds per inch
min = minute

Two compositions were prepared. One, composition A contained 50 weight percent of the block copolymer in this example and 50 weight percent Escorez 1310. The second composition was 55 weight percent Kraton 1107 and 45 weight percent Escorez 1310. These compositions were selected for comparison because from the data in Table II and Table V they showed comparable tack, peel strength and quick stick. The Brookfield viscosities were determined at various temperatures and are set forth in Table VI.

TABLE VI

| BROOKFIELD VISCOSITIES OF ADHESIVE COMPOSITIONS IN CPS | | | | |
| --- | --- | --- | --- | --- |
| Temperature Degrees Fahrenheit | 335 | 355 | 375 | 400 |
| Composition A | 26,100 | 17,00 | 12,000 | 7,000 |
| Composition B | 26,100 | 24,500 | 15,500 | 10,700 |

The data in Table VI clearly discloses that compositions in accordance with the present invention have lower viscosities at higher temperatures than with the conventionally used resins:

EXAMPLE 3

A 30 gallon nitrogen filled reactor was charged with 61.1 kilograms of alpha-methylstyrene, 6.55 kilograms of butadiene and 1.46 kilograms of styrene. An aliquot amount of the charge was withdrawn from the reactor. To this aliquot a small amount of tetrahydrofuran was added and a sec-butyllithium solution in cyclohexane was added until color appeared. Based on the titration the amount of impurities in the remaining feed which was 59.42 kilograms of alpha-methylstyrene, 6.37 kilograms of butadiene, and 1.42 kilograms of styrene was determined to be equivalent to 41.6 millieqivalents of secbutyllithium. The content of the reactor was heated to 40 degrees centigrade and 163.8 millimoles of a hereinbefore described difunctional lithium initiator was added. Polymerization started shortly after the initiator addition and was completed in about two and one-half hours during which time the temperature of the reactor rose to a maximum of 87 degrees centigrade. The resultant product was a triblock copolymer having the ABA configuration in which block A was an alpha-methylstyrene styrene copolymer and the B block was a polybutadiene. The product was soluble in the alpha-methylstyrene monomer used as solvent in the polymerization. A solution of 13.4 milliliters of isopropanol in 20 milliliters of toluene was added to terminate a majority of the active chain ends. The resultant solution was then maintained at 75 degrees centigrade for 30 minutes to insure all reactive chain ends were terminated. After the reaction mixtue had cooled to room temperature, a small sample was withdrawn for analysis. To the remaining solution 1.384 kilograms of styrene and 6.94 kilograms of butadiene was added. The solution was heated to 46 degrees centigrade and a second addition of 152 millimoles of the difunctional initiator was added. The second polymerization lasted for about one and one-half hours and the product was similar to that of the first polymerization. The reaction was terminated by the addition of 51.2 millilters of isopropanol. A hindered phenol stabilizer commercially available under the trade designation of Isonox 129 from Schenectady Chemicals was added in a quantity of 42.2 grams and the reactor left undisturbed overnight. Additional stabilizers were added the following day before the product was recovered from the excess alpha-methylstyrene by drying in a heated vacuum oven. Final yield was 19.5 kilograms of ABA block copolymer containing 64.1 weight percent butadiene, 13.3 weight percent styrene and 22.6 weight percent alphamethylstyrene. The molecular weight was determined to be 78,000 molecular weight units by gel permeation chromatography. The resultant ABA block copolymer was mixed with a hydrogenated hydrocarbon resin tackifier commercially available under the trade designation of Escorez 5380 from Exxon Chemical Company and a stabilizer commercially available under the trade designation of IRGANOX 1010. The materials were combined in a weight ratio of 60:40 and 1 respectively.

For purposes of evaluation samples were prepared by the solution method as delineated in Example 1. The rolling ball tack value was 15 centimeters; the peel strength was 1.8 pounds per inch and the quick stick as tested by test method PSTC-5 was 1.4 pounds per inch.

A second combination was prepared containing 50 parts by weight of the block copolymer prepared above and 40 parts by weight of Zonatac 105 and 10 parts by weight Zonarez A25. Evaluation indicating its tack was 16 centimeters, peel strength was 2.2 pounds per inch and quick stick was 1.2 pounds per inch. Zonatac and Zonarez A25 are polyterpene tackifiers obtained from Arizona Chemical Company.

EXAMPLE 4

A one-liter glass reactor was nitrogen purged and charged with 400 milliliters of alpha-methylstyrene. A small amount of sec-butyllithium solution was added slowly until a faint straw color appeared. The reactor was then charged with 49 grams of isoprene and 3.8 grams of styrene. The reaction mixture was heated to 45 degrees centigrade and 0.45 millimole of the hereinbefore described difunctional initiator solution was added. The reaction mixture was heated to 50 degrees centigrade and maintained at or above 50 degrees centigrade for about two hours. During the two-hour period, the temperature had risen to a maximum of 95 degrees centigrade and the color had changed to a brownish orange. To terminate the reaction, 0.5 milliliter of acetic acid was added. The polymer was recovered from the excess alpha-methylstyrene by precipitating with methanol from the reaction mixture and again from a methylene chloride solution. The resultant polymer was an ABA triblock with polyisoprene as the center block and alpha-methylstyrene styrene copolymer as the end blocks. About 50 grams of product was obtained, having a composition of 81.2 weight percent isoprene, 12.5 weight percent alpha-methylstyrene and 6.3 weight percent styrene. The molecular weight as determined by gel permeation chromatography was 212,000.

A solution of 60 parts of the triblock copolymer with 40 parts by weight of Escorez 1310 was dissolved in toluene and applied to polyester film for further evaluation. The peel strength was determined to be 2.8 pounds per inch, the rolling ball tack was 15 centimeters and quick stick was 1.6 pounds per inch.

EXAMPLE 5

The polymerization procedure of Example 4 was repeated with the exception that 1 millimeter of isoprene was added to the difunctional initiator solution and the initiator solution was then heated to 70 degrees centigrade for a period of 7 minutes before use. The reactor was fed only alpha-methylstyrene and isoprene. The required amount of styrene was added when the temperature of the reaction mixture rose to its maximum. The resulting triblock copolymer had the same composition as the copolymer of Example 4 except that the structure was less tapered. The molecular weight as determined by gel permeation chromatography was 196,000 molecular weight units. 60 parts of the resultant ABA copolymer were mixed with 40 parts by weight of Escorez 1310 dissolved in toluene and applied to a polyester film for evaluation. The peel strength was determined to be 3.5 pounds per inch; the rolling ball tack was 9 centimeters; and the quick stick value was 2.1 pounds per inch.

EXAMPLE 6

The polymerization procedure of Example 4 was repeated with the following exceptions: 10.9 grams of butadiene was used, and 31.3 grams of isoprene. The initiator was 0.73 millimoles of the hereinbefore described difunctional initiator. The quantity of styrene used was 4.5 grams and was withheld from the feed until the polymerization temperature of the diene monomer reached its maximum value. The polymer recovered was an ABA triblock polymer with an isoprene butadiene copolymer as the center block and alpha-methylstyrene styrene as the end blocks. The composition was 19.7 percent by weight butadiene, 56.6 percent by weight isoprene, 15.5 percent by weight alpha-methylstyrene and 8.2 percent by weight styrene. The molecular weight as determined by gel permeation chromatography was 123,000 molecular weight units.

Its value in a pressure sensitive adhesive formulation was determined by admixing 60 parts of the block copolymer with 40 parts of Escorez 1310 in toluene and applying to polyester film, as in Example 1. The peel strength was 3.3 pounds per inch; the rolling ball tack just exceeded 26 centimeters and the quick stick value was 2.4 pounds per inch.

As is apparent from the foregoing specification, the present invention is susceptible of being embodied with various alterations and modifications which may differ particularly from those that have been described in the preceding specification and description. For this reason, it is to be fully understood that all of the foregoing is intended to be merely illustrative and is not to be construed or interpreted as being restrictive or otherwise limiting of the present invention, excepting as it is set forth and defined in the hereto-appended, claims.

What is claimed is:

1. A pressure sensitive adhesive composition comprising
   (1) a block coploymer of ABA configuration wherein A is a copolymer of alpha-methylsytrene and styrene and the B portion of the polymer is a polydiene;
   (2) a diblock copolymer of AB type of an amount from 0 to 20 parts by weight per hundred parts of the ABA triblock copolymer;
   (3) a tackifying resin compatible with block B in the amounat of 10 to 200 parts hundred parts of the ABA block copolymer;
   (4) a reinforcing resin having a higher softening point than the block A in the ABA polymer in the amount of from about 0 to 100 parts per hundred parts of the block ABA block copolymer;
   (5) an extending oil in an amount from 0 to 50 parts by weight per hundred parts by weight of the ABA block copolymer; and
   (6) a stablizer in the amount of 0 to 5 parts per hundred parts by weight of the ABA block copolymer.

2. The composition of claim 1 wherein the ABA block has an alpha-methylstyrene to styrene weight ratio of from 2 to 98 to 98 to 2.

3. The composition of claim 2 wherein the weight ratio of alpha-methylstyrene to styrene is from about 1.1 to 2.5 to 1.

4. The composition of claim 1 wherein the B block is a member selected from the group consisting of polyisoprene, polybutadiene and a copolymer of butadiene and isoprene.

5. The composition of claim 1, where in the ABA block copolymer the weight ratio of the A block to the B block is from about 10 to 90 to 45 to 55.

6. The composition of claim 5 wherein the weight ratio of the A block to the B block in the ABA copolymer is from about 15 to 85 to about 30 to 70.

7. The composition of claim 1 wherein the tackifying resin is selected from the group consisting of rosin ester resins, polyterpenes, polydipentenes, polypinenes, dihydrogenated resins, glycerol esters of hydrogenated rosin, pentaerythritol esters of hydrogenated rosin.

* * * * *